March 10, 1970 R. W. DANIELS 3,500,262
NONRECIPROCAL GYRATOR NETWORK
Filed Oct. 15, 1968
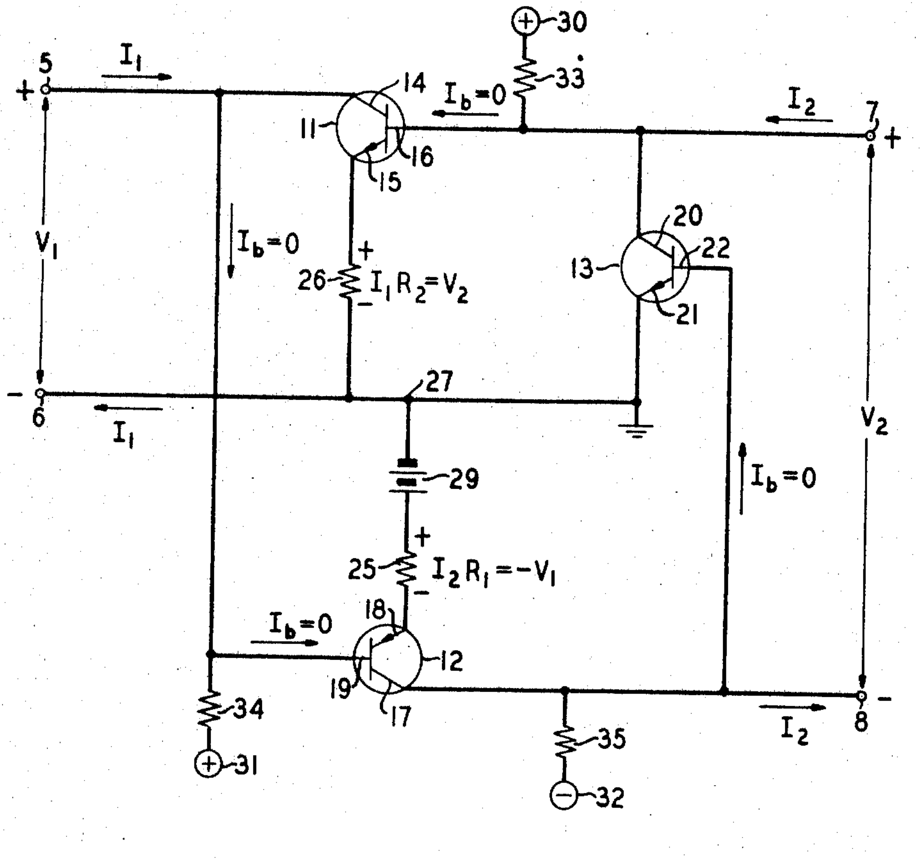
INVENTOR
R. W. DANIELS
BY [signature]
ATTORNEY United States Patent Office 3,500,262

Patented Mar. 10, 1970

3,500,262

NONRECIPROCAL GYRATOR NETWORK

Richard W. Daniels, Andover, Mass., assignor to Bell Telephone Laboratories, Incorporated, Murray Hill, N.J., a corporation of New Jersey Filed Oct. 15, 1968, Ser. No. 767,662
Int. Cl. H01p 1/24, 1/32
U.S. Cl. 333—80 3 Claims

ABSTRACT OF THE DISCLOSURE

A basic two-port gyrator circuit is disclosed having three transistors and two resistors. One port has one terminal at a collector-base connection of the first and second transistors and another terminal at the emitter of the third transistor, and the other port has one terminal at a base-collector connection of the first and third transistors and another terminal at a base-collector connection of the second and third transistors. One resistor is connected between the emitters of the first and third transistors, and the other resistor is connected between the emitters of the second and third transistors. The circuit arrangement disclosed is capable of simulating high quality inductors.

BACKGROUND OF THE INVENTION

This invention relates generally to nonreciprocal electric networks and more particularly to transistor gyrator circuits.

Broadly speaking, network synthesis may be defined as "the methods by which an electric network can be formed to realize a prescribed characteristic," (K. L. Su, "Active Network Synthesis," page 1 (McGraw-Hill, Inc., 1965)). In the past, network synthesis was based on the existence of simple circuit elements, such as resistors, capacitors, inductors and transformers. But, with the advent of modern synthesis techniques many new elements having specialized electrical characteristics were developed. Some of these, such as the negative resistance, the nullator, norator, circulator and gyrator are described simply by Su at pages 8–39 in the above mentioned article.

Often new elements for electric networks are defined theoretically and mathematically before a realizable physical representation is found. The gyrator, for one, was first described theoretically as early as 1948 by B. Tellegen in "The Gyrator, a New Electric Network Element," Philips Research Reports, vol. 3, No. 2, pages 81–101 (1948). Since that time a number of patents have issued disclosing various transistor circuits which approximated the characteristics of the theoretical gyrator. The present invention is an inexpensive alternative transistor network which more closely approximates the characteristics of the theoretical gyrator than many circuits in the prior art. Because of its relatively high quality the present gyrator circuit offers the designer greater latitude in using such circuits in practical networks.

The gyrator is a four-terminal, two-port network which may be defined by the following pair of equations:

$$V_1 = -I_2 R_1 \quad (1)$$

$$V_2 = I_1 R_2 \quad (2)$$

where $I_1$ is the current into and $V_1$ is the voltage across the two terminals constituting one port, and $I_2$ is the current into and $V_2$ is the voltage across the two terminals constituting the second port. As may be noted from Equations 1 and 2, the gyrator associates its name with the fact that it "gyrates" an input voltage into an output current and vice versa. $R_1$ and $R_2$ are transfer impedances whose product determines the gyration constant K. In an ideal passive gyrator circuit as defined by Tellegen in the above cited article, the transfer impedances, $R_1$ and $R_2$ are equal, but in general they may be unequal.

The gyrator is important in network synthesis because it is one of the simplest and most basic nonreciprocal networks from which other nonreciprocal networks such as the circulator can be formed. In simple terms, a network is reciprocal when a voltage source inserted in one part of the network produces a current at some other part of the network such that the ratio of the applied voltage to the measured current, called the transfer impedance, will be the same if the relative positions of the driving source and the measured effect are reversed. Electrical networks which contain only resistors, capacitors, inductors and transformers generally are the reciprocal networks. The gyrator, however, is always nonreciprocal since the transfer impedance for one direction of propagation always differs in sign from that for propagation in the reverse direction, as demonstrated by the different signs in Equations 1 and 2 above. A gyrator may be further nonreciprocal in that the magnitude of the transfer impedances, $R_1$ and $R_2$, in Equations 1 and 2 may in general be unequal.

In practical application, the gyrator is important as a positive impedance inverter. That is, if an impedance $+Z$ is connected between one pair of terminals, the impedance measured at the other terminals is proportional to $+1/Z$. Thus, for example, if the gyrator network defined by Equations 1 and 2 is terminated with an output impedance $Z_{out}$, the input impedance will be defined by Equation 3:

$$Z_{in} = \frac{R_1 R_2}{Z_{out}} = \frac{K}{Z_{out}} \quad (3)$$

where K is again the gyration constant. As a result, a capacitor with an impedance $1/j\omega C$ can be made to appear as an inductor with an impedance $j\omega KC$ through the use of a gyrator circuit.

The ability to substitute a capacitor and a gyrator for an inductor is significant in the integrated circuit art because the inductor has been especially difficult to realize with known integrated techniques. Also, even in conventional circuits large and expensive coils have been required in order to provide inductance at low frequencies. Thus in many circuit applications it may be less expensive and more efficient to use the present gyrator circuit with a capacitor than to use the simple elemental inductor.

It is therefore the object of the present invention to provide an inexpensive transistor network which produces gyrator action and is capable of simulating high quality inductors.

SUMMARY OF THE INVENTION

The present invention is a high quality two-port gyrator circuit which contains three transistors having emitter, collector and base electrodes. The collector of a first transistor is connected to the base of a second transistor, and the base of the first transistor is connected to the collector of a third transistor, while the collector of the second transistor is connected to the base of the third transistor. The emitter of the third transistor is connected through one resistor to the emitter of the second transistor and through another resistor to the emitter of a first transistor. Gyrator action is produced between one port which has alternating current connections directly to the collector of the first transistor, the base of the second transistor and the emitter of the third transistor, and another port which has alternating current connections directly to the base electrodes of the first and third transistors and the collector electrodes of the second and third transistors.

BRIEF DESCRIPTION OF THE DRAWINGS

The above described invention will be more fully comprehended from the following detailed description taken in conjunction with the drawing in which the figure is a schematic diagram of a gyrator circuit embodying the invention.

DETAILED DESCRIPTION

In the drawing the figure shows a gyrator circuit embodying the present invention. The only active elements are transistors 11, 12 and 13, each having emitter, collector and base electrodes. The collector 14 of transistor 11 is connected directly to base 19 of transistor 12, while base 16 of transistor 11 is connected directly to collector 20 of transistor 13. Collector 17 of transistor 12 is connected directly to base 22 of transistor 13. Emitter 21 of transistor 13 is connected to emitter 18 of transistor 12 through resistor 25, having a resistance $R_1$, and to emitter 15 of transistor 11 through resistor 26, having a resistance $R_2$.

The gyrator circuit shown in the figure is a two-port network with a pair of input and output terminals. Input terminal 5 is connected directly to collector 14 of transistor 11 and base 19 of transistor 12, while input terminal 6 is connected directly to emitter 21 of transistor 13. Output terminal 7 is connected directly to collector 20 of transistor 13 and base 16 of transistor 11, and output terminal 8 is connected directly to base 22 of transistor 13 and collector 17 of transistor 12. Adopting the convention described for Equations 1 and 2 above, input voltage $V_1$ is supplied across input terminals 5 and 6 and output voltage $V_2$ is measured across output terminals 7 and 8 as shown in the figure. In addition, current $I_1$ is assumed to flow into the network at input terminal 5 and out of the network at input terminal 6, and current $I_2$ is assumed to flow into the network at output terminal 7 and out of the network at output terminal 8.

By convention, the direction of the arrows on the emitter electrodes of transistors 11, 12 and 13 are defined to be in the direction in which direct current will flow through these electrodes. However, once the transistor is properly biased in its operating range, current may be assumed to flow in either direction from the emitter to the collector. Bias sources 29, 30, 31 and 32 and resistors 33, 34 and 35, connected as shown in the figure, bias transistors 11, 12 and 13 in their operating ranges in a manner well known in the prior art. As may be appreciated, both the voltage of the bias sources 29, 30, 31 and 32 and the resistance of resistors 33, 34 and 35 may be varied to accommodate each of the transistors. In the discussion, below, it will be assumed that these biasing elements do not affect the alternating current response of the network.

That the circuit shown in the figure satisfies Equations 1 and 2 above, may be shown by the following analysis:

Assume ideal transistors are used, i.e., that the base current $I_b$ equals 0, that the voltage between the base and the emitter electrodes $V_{be}$ equals 0 and that the emitter current $I_e$ ie equal to the collector current $I_c$. Since $I_c$ equals $I_e$ of transistor 11 and since $I_b$ of transistor 12 equals 0, all of input current $I_1$, at input terminal 5, flows through collector 14 to emitter 15 of transistor 11. Current $I_1$, at emitter 15, then flows through resistor 26, causing a voltage drop $I_1R_2$ in the direction shown, and appears at input terminal 6. But, since $V_{be}$ of transistors 11 and 13 equal 0, the positive pole of voltage $V_2$ at output terminal 7 may be traced through base 16 to emitter 15 of transistor 11, and the negative pole of voltage $V_2$ at output terminal 8 may be traced through base 22 to emitter 21 of transistor 13. Thus, voltage $V_2$ appears across resistor 26 so that $V_2$ equals $I_1R_2$, thereby satisfying Equation 2.

Similarly, since $I_c$ equals $I_e$ for transistor 13 and $I_b$ for transistor 11 equals 0, all of output current $I_2$, at output terminal 7, flows through collector 20 to emitter 21 of transistor 13. Also since $I_c$ equals $I_e$ for transistor 12, output current $I_2$ flowing out of the network at output terminal 8 must flow from emitter 18 to collector 17 of transistor 12. Output current $I_2$, therefore, traces an alternating current signal path from emitter 21 of transistor 13 through resistor 25 to emitter 18 of transistor 12, causing a voltage drop $I_2R_1$ across resistor 25 in the direction as shown. But, since $V_{be}$ of transistor 12 equals 0, the positive pole of input voltage $V_1$, at input terminal 5, may be traced through base electrode 19 to emitter electrode 18 of transistor 12, while the negative pole of voltage $V_1$, at input terminal 6, may be traced directly to junction 27. Thus, voltage $V_1$ appears across resistor 26 in a direction opposite to the flow of current $I_2$ so that $V_1$ equals $-I_2R_1$, thereby satisfying Equation 1 and producing gyrator action between input terminals 5 and 6 and output terminal 7 and 8 in accordance with the invention.

In the embodiment of the invention shown in the figure, terminals 5 and 6 are considered to be input terminals and terminals 7 and 8 are considered to be output terminals. It is to be understood, however, that gyrator action may also be obtained if the input is applied at terminals 7 and 8 and the output taken at terminals 5 and 6. In addition, it should be understood that while transistors 11 and 12 are shown to be NPN transistors and transistor 13 is shown to be a PNP transistor, the same circuit may be made to operate equally well with other combinations of NPN and PNP transistors by techniques well known in the art.

Thus, in accordance with the invention, a new high quality transistor gyrator network is made available to the circuit designer, providing him with greater latitude in choice of design than heretofore available.

It is to be understood that the above described circuit arrangement is merely illustrative of an application of the principles of the invention. Numerous other arrangements may be devised by those skilled in the art without departing from the spirit and scope of the invention.

What is claimed is:

1. A gyrator network having an input port with first and second input terminals and an output port with first and second output terminals comprising in combination:

- a plurality of transistors each having emitter, collector, and base electrodes;
- means connecting the collector of a first transistor to the base of a second transistor;
- means connecting the base of the first transistor to the collector of a third transistor;
- means connecting the collector of the second transistor to the base of the third transistor;
- means including impedance means connecting the emitter of the third transistor to the emitter electrodes of the first and second transistors;
- said first input terminal connected directly to the collector of the first transistor and the base of the second transistor, and said second input terminal connected directly to the emitter of the third transistor;
- said first output terminal connected directly to the base of the first transistor and the collector of the third transistor, and said second output terminal connected directly to the collector of the second transistor and the base of the third transistor.

2. A gyrator network having first and second input terminals and first and second output terminals, an input voltage $+V_1$ being supplied at said first input terminal with respect to said second input terminal and an input current $I_1$ being supplied into said network at said first input terminal and out of said network at said second input terminal, an output voltage $+V_2$ being measured at said first output terminal with respect to said second output terminal and an output current $I_2$ being measured into said network at said first output terminal and out of said network at said second output terminal comprising in combination:

- first, second and third transistors each having emitter, collector, and base electrodes;

the base of said first transistor connected to said first output terminal and the collector of said first transistor connected to said first input terminal so that substantially all of said input current $I_1$ at said input terminal is transmitted to said emitter electrode;

a first impedance means having a resistance $R_2$ connected to transmit said current $I_1$ from the emitter of said first transistor to said second input terminal;

the collector of said third transistor connected to said first output terminal, the base of said third transistor connected to said second output terminal, and the emitter of said third transistor connected to said second input terminal in such a manner that said voltage $V_2$ appears substantially across said first impedance means and satisfies the following voltage and current relationship:

$$V_2=I_1R_2$$

means connecting the base of said second transistor to said first input terminal, and means connecting the collector of said second transistor to said second output terminal;

a second impedance means having a resistance $R_1$ connecting the emitter of said second transistor and the emitter of said third transistor such that substantially all of current $I_2$ flows from said first output terminal through the collector to the emitter of said third transistor and from said emitter of said third transistor through said second impedance means to said emitter of said second transistor; and means connecting the emitter of said third transistor to said second input terminal in a manner such that said voltage $V_1$ appears substantially across said second impedance means and satisfies the following voltage and current relationship:

$$V_1=-I_2R_1$$

whereby gyrator action is produced between said input and output terminals.

3. A gyrator network comprising in combination:

first, second, and third transistors each having emitter, collector, and base electrodes;

an input port having first and second input terminals;

an output port having first and second output terminals;

the collector of said first transistor connected to said first input terminal and the base of said first transistor connected to said first output terminal;

the base of said second transistor connected to said first input terminal and to the collector of said first transistor, and the collector of said second transistor connected to said second output terminal;

the collector of said third transistor connected to the base of said first transistor and to said first output terminal, and the base of said third transistor connected to the collector of said second transistor and to said second output terminal;

first impedance means connecting the emitter of said first transistor to said second input terminal and the emitter of said third transistor; and second impedance means connecting the emitter of said second transistor to said second input terminal and the emitter of said third transistor so that gyrator action is produced between said input and output ports.

References Cited

Mitra, Alternate Realization of Four-Terminal and Three-Terminal Negative-Impedance Inverters, Proc. of IEEE, March 1968, 333–80.

ELI LIEBERMAN, Primary Examiner

PAUL L. GENSLER, Assistant Examiner

U.S. Cl. X.R.

307—295, 322